US011287517B2

(12) United States Patent
Dehlinger et al.

(10) Patent No.: US 11,287,517 B2
(45) Date of Patent: Mar. 29, 2022

(54) SINGLE FRAME DISTANCE DISAMBIGUATION

(71) Applicant: Sense Photonics, Inc., Durham, NC (US)

(72) Inventors: Dietrich Dehlinger, San Francisco, CA (US); Hod Finkelstein, Berkeley, CA (US)

( * ) Notice: Subject to any disclaimer, the term of this patent is extended or adjusted under 35 U.S.C. 154(b) by 0 days.

(21) Appl. No.: 17/268,756

(22) PCT Filed: Apr. 17, 2020

(86) PCT No.: PCT/US2020/028680
§ 371 (c)(1),
(2) Date: Feb. 16, 2021

(87) PCT Pub. No.: WO2020/214914
PCT Pub. Date: Oct. 22, 2020

(65) Prior Publication Data
US 2021/0247500 A1  Aug. 12, 2021

Related U.S. Application Data

(60) Provisional application No. 62/836,372, filed on Apr. 19, 2019.

(51) Int. Cl.
*G01S 7/48* (2006.01)
*G01S 7/4863* (2020.01)
(Continued)

(52) U.S. Cl.
CPC .......... *G01S 7/4863* (2013.01); *G01S 7/4815* (2013.01); *G01S 7/4865* (2013.01); *G01S 17/10* (2013.01); *G01S 17/894* (2020.01)

(58) Field of Classification Search
None
See application file for complete search history.

(56) References Cited

U.S. PATENT DOCUMENTS 7,791,715 B1 * 9/2010 Bamji .................... G01S 7/481
356/5.1
2004/0135992 A1  7/2004 Munro
(Continued)

FOREIGN PATENT DOCUMENTS

EP          1103786        5/2001

OTHER PUBLICATIONS

PCT Notification of Transmittal of the International Search Report and the Written Opinion of the International Searching Authority, or the Declaration, dated Jun. 30, 2020 for corresponding International Application No. PCT/US20/28680.

*Primary Examiner* — Hovhannes Baghdasaryan
(74) *Attorney, Agent, or Firm* — Myers Bigel, P.A.

(57) ABSTRACT

A Time of Flight (ToF) system, includes one or more optical elements configured to emit optical signals at two or more measurement frequencies and at least one disambiguation frequency, a detector array comprising a plurality of detectors that are configured to output respective detection signals responsive to light provided thereto, and a circuit configured to control the detector array to obtain a first subset of the detection signals at a first plurality of phase offsets corresponding to the two or more measurement frequencies and to obtain a second subset of the detection signals at a second plurality of phase offsets corresponding to the at least one disambiguation frequency, wherein the second plurality comprises fewer phase offsets than the first plurality.

21 Claims, 4 Drawing Sheets

(51) Int. Cl.
  *G01S 17/894* (2020.01)
  *G01S 7/481* (2006.01)
  *G01S 7/4865* (2020.01)
  *G01S 17/10* (2020.01)

(56) References Cited

U.S. PATENT DOCUMENTS

| | | | |
|---|---|---|---|
| 2011/0188028 A1* | 8/2011 | Hui .................. | G01S 7/4915 |
| | | | 356/5.01 |
| 2014/0049767 A1* | 2/2014 | Benedetti ............. | G01S 17/894 |
| | | | 356/5.1 |
| 2014/0233942 A1 | 8/2014 | Kanter | |
| 2018/0031681 A1 | 2/2018 | Yoon et al. | |

* cited by examiner

SINGLE FRAME DISTANCE DISAMBIGUATION

CLAIM OF PRIORITY

This application is a 35 U.S.C. 371 national stage application of PCT International Application No. PCT/US2020/028680, filed on Apr. 17, 2020, which claims priority from U.S. Provisional Patent Application No. 62/836,372, filed Apr. 19, 2019, entitled "SINGLE FRAME DISTANCE DISAMBIGUATION", the entire contents and disclosures of which are incorporated by reference herein in their entireties.

FIELD

The present disclosure is directed to LIDAR systems, and more particularly, to methods and devices to more accurately determine a distance to a target in time-of-flight LIDAR systems.

BACKGROUND

Time of flight (ToF) based imaging is used in a number of applications including range finding, depth profiling, and 3D imaging (e.g., Light Detection And Ranging (LIDAR), also referred to herein as lidar). ToF 3D imaging systems can be categorized as indirect ToF (iToF) or direct ToF systems.

Direct ToF measurement includes directly measuring the length of time between emission of radiation by emitter element(s) of a LIDAR system, and sensing the radiation after reflection from an object or other target (also referred to herein as an echo signal) by detector element(s) of the LIDAR system. From this length of time, the distance to the target can be determined.

Indirect ToF measurement includes modulating the amplitude of the signals emitted by the emitter element(s) and measuring phases (e.g., with respect to delay or shift) of the echo signals received at the detector element(s). These phases may be measured with a series of separate measurements or samples. The results of these measurements produce multiple (e.g., two) vector components, the angle formed by these components is the phase angle. The range or distance d to the target can be calculated from the detected phase shift of the returning echo signal:

$$d = \frac{ct}{2} = \frac{\varphi}{2\pi} \frac{c}{2f_m}$$

where c is the speed of light, t is the time required for a photon to travel to the target and back to the detector, phi ($\varphi$) is the phase shift of the modulated signal and $f_m$ is the modulation frequency of the emitted signal, also referred to herein as the frequency of operation or operating frequency of the emitter.

Since the maximum phase is $2\pi$, the unambiguous range UR=c/2 $f_m$ for the frequency $f_m$ of operation. The unambiguous range may refer to the range beyond which the phase to distance mapping "wraps around" for an iToF system, such that targets therebeyond may be reported as having a shorter range than their real or actual range, where phase_reported=phase_real mod ($2\pi$). For example, due to the repeated pulsed nature of the light, an unambiguous range of 10 meters (m) may result in a 2 m measurement for an object whose actual distance is 12 m.

SUMMARY

According to some embodiments of the present disclosure, a Time of Flight (ToF) system, includes one or more optical elements configured to emit optical signals at two or more measurement frequencies and at least one disambiguation frequency, a detector array comprising a plurality of detectors that are configured to output respective detection signals responsive to light provided thereto, and a circuit configured to control the detector array to obtain a first subset of the detection signals at a first plurality of phase offsets corresponding to the two or more measurement frequencies and to obtain a second subset of the detection signals at a second plurality of phase offsets corresponding to the at least one disambiguation frequency, wherein the second plurality comprises fewer phase offsets than the first plurality.

In some embodiments, the circuit is configured to determine a plurality of potential distances for a target illuminated by the optical signals based on the first subset of the detection signals, and to identify a subset of plurality of potential distances based on the second subset of the detection signals.

In some embodiments, the at least one disambiguation frequency comprises two or more frequencies.

In some embodiments, the at least one disambiguation frequency is less than a difference between the two or more measurement frequencies.

In some embodiments, the first subset and the second subset collectively define a frame of operation of the plurality of detectors comprising consecutive subframes.

In some embodiments, the first plurality of phase offsets comprises four phase offset.

In some embodiments, the first plurality of phase offsets comprises four phase offsets corresponding to a first primary frequency of the two or more measurement frequencies and four phase offsets corresponding to a second primary frequency of the two or more measurement frequencies, and the second subset of the detection signals comprises only a single phase offset corresponding to the at least one disambiguation frequency.

In some embodiments, a first unambiguous range of the two or more measurement frequencies is less than a second unambiguous range of the at least one disambiguation frequency.

According to some embodiments of the present disclosure, a Time of Flight (ToF) system, includes one or more optical elements configured to emit first optical signals at two or more measurement frequencies and to emit second optical signals at one or more disambiguation frequencies, a detector array comprising a plurality of detectors that are configured to output respective detection signals responsive to light provided thereto, and a circuit. The circuit is configured to perform operations including receiving first detection signals from the detector array, the first detection signals representing a first plurality of phase offsets associated with the first optical signals, receiving second detection signals from the detector array, the second detection signals representing a second plurality of phase offsets associated with the second optical signals, wherein the second plurality comprises fewer phase offsets than the first plurality, computing an estimated distance to a target based on the first detection signals, and computing an actual distance to the target based on the estimated distance and the second detection signals.

In some embodiments, the circuit is configured to determine a plurality of potential distances of the target based on the first detection signals, and to identify a subset of plurality of potential distances based on the second detection signals.

In some embodiments, the one or more disambiguation frequencies are less than a difference between the two or more measurement frequencies.

In some embodiments, the first detection signals comprise a first plurality of subframes received from the detector array at a first plurality of phase offsets, each of the first plurality of subframes comprising the first detection signals corresponding to one of the first plurality of phase offsets, and the second detection signals comprise a single subframe received from the detector array at a second phase offset.

In some embodiments, the first plurality of phase offsets comprises four phase offsets.

In some embodiments, the first detection signals comprise four phase offset measurements at a first primary frequency of the two or more measurement frequencies and four phase offset measurements at a second primary frequency of the two or more measurement frequencies, and the second detection signals comprise only a single phase offset measurement at the one or more disambiguation frequencies.

In some embodiments, a first unambiguous range of the two or more measurement frequencies is less than a second unambiguous range of the one or more disambiguation frequencies.

In some embodiments, the one or more optical elements are further configured to be phase-locked to a clock signal to emit the first optical signals as bursts of pulsed light at the two or more measurement frequencies, and the plurality of detectors are further configured to output the first detection signals based on measurements taken at phase delays of the two or more measurement frequencies.

In some embodiments, the one or more optical elements are further configured to offset the second optical signals relative to the clock signal from the first optical signals In some embodiments, the one or more optical elements are further configured to be phase-locked to a clock signal to emit the first optical signals as bursts of pulsed light that are offset relative to the clock signal by phase delays of the two or more measurement frequencies, and the plurality of detectors are further configured to output the first detection signals based on measurements taken responsive to the bursts of pulsed light.

According to some embodiments of the present disclosure, a method of calculating an actual distance to a target in a lidar system, includes receiving first detection signals from a detector array of the lidar system responsive to first optical signals emitted by one or more optical elements at two or more measurement frequencies, the first detection signals representing a first plurality of phase offsets associated with the first optical signals, receiving second detection signals from the detector array responsive to second optical signals emitted by the one or more optical elements at one or more disambiguation frequencies, the second detection signals representing a second plurality of phase offsets associated with the second optical signals, wherein the second plurality comprises fewer phase offsets than the first plurality, computing an estimated distance to the target based on the first detection signals, and computing the actual distance to the target based on the estimated distance and the second detection signals.

In some embodiments, computing the actual distance to the target comprises determining a plurality of potential distances of the target based on the first detection signals, and reducing a number of the plurality of potential distances based on the second detection signals.

In some embodiments, the one or more disambiguation frequencies are less than a difference between the two or more measurement frequencies.

In some embodiments, the first detection signals comprise a first plurality of subframes received from the detector array at a first plurality of phase offsets, and the second detection signals comprise a single subframe received from the detector array at a second phase offset.

In some embodiments, a first unambiguous range of the two or more measurement frequencies is less than a second unambiguous range of the one or more disambiguation frequencies.

In some embodiments, the one or more disambiguation frequencies are different from each of the two or more measurement frequencies.

DETAILED DESCRIPTION

In the following detailed description, numerous specific details are set forth to provide a thorough understanding of embodiments of the present disclosure. However, it will be understood by those skilled in the art that the present disclosure may be practiced without these specific details. In some instances, well-known methods, procedures, components and circuits have not been described in detail so as not to obscure the present disclosure. It is intended that all embodiments disclosed herein can be implemented separately or combined in any way and/or combination. Aspects described with respect to one embodiment may be incorporated in different embodiments although not specifically described relative thereto. That is, all embodiments and/or features of any embodiments can be combined in any way and/or combination.

Embodiments of the present disclosure are described herein with reference to lidar applications and systems. A lidar system may include an array of emitters and an array of detectors, or a system having a single emitter and an array of detectors, or a system having an array of emitters and a single detector. As described herein, one or more emitters may define an emitter unit, and one or more detectors may define a detector pixel. A flash lidar system may acquire a three-dimensional perspective (e.g., a point cloud) of one or more targets by emitting light from an array of emitters, or a subset of the array, for short durations (pulses) over a field of view (FoV) or scene, and detecting the echo signals reflected from one or more targets in the FoV at one or more detectors. A non-flash or scanning lidar system may generate image frames by raster scanning light emission (continuously) over a field of view or scene, for example, using a point scan or line scan to emit the necessary power per point and sequentially scan to reconstruct the full FoV.

Figure 1A:
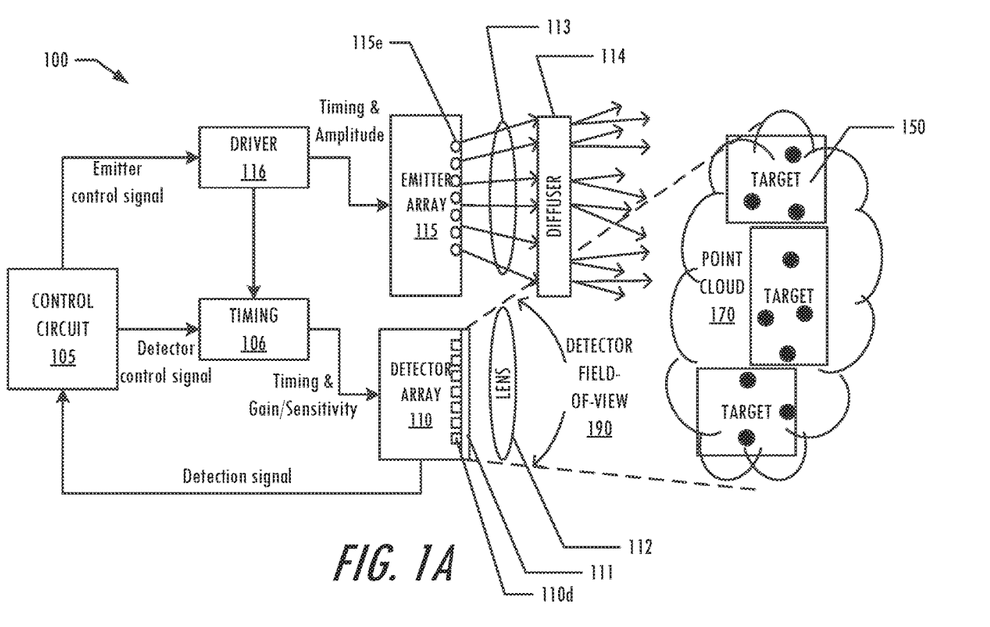
FIG. 1A is an example lidar system according to some embodiments described herein.

An example of a lidar system or circuit 100 in accordance with embodiments of the present disclosure is shown in FIG. 1A. The lidar system 100 includes a control circuit 105, a timing circuit 106, an emitter array 115 including a plurality of emitters 115e, and a detector array 110 including a plurality of detectors 110d. The detectors 110d include time-of-flight sensors. In some embodiments, the detectors 110d of the detector array 110 may include single-photon detectors, such as a single photon avalanche detector (SPAD) array. SPAD arrays may be used as solid-state detectors in imaging applications where high sensitivity and timing resolution are desired.

One or more of the emitter elements 115e of the emitter array 115 may define emitter units that respectively emit a radiation pulse or continuous wave signal (for example, through a diffuser or optical filter 114) at a time and frequency controlled by a timing generator or driver circuit 116. In particular embodiments, the emitters 115e may be pulsed light sources, such as LEDs or lasers (such as vertical cavity surface emitting lasers (VCSELs)). Radiation is reflected back from a target 150, and is sensed by detector pixels defined by one or more detector elements 110d of the detector array 110. The control circuit 105 implements a pixel processor that measures and/or calculates the time of flight of the illumination pulse over the journey from emitter array 115 to target 150 and back to the detectors 110d of the detector array 110, using direct or indirect ToF measurement techniques. The system 100 can be coupled to a vehicle such that the emitter elements 115e and detector elements 110d are oriented relative to an intended direction of travel of the vehicle.

In some embodiments, an emitter module or circuit 115 may include an array of emitter elements 115e (e.g., VCSELs), a corresponding array of optical elements 113, 114 coupled to one or more of the emitter elements (e.g., lens(es) 113 (such as microlenses) and/or diffusers 114), and/or driver electronics 116. The optical elements 113, 114 may be optional, and can be configured to provide a sufficiently low beam divergence of the light output from the emitter elements 115e so as to ensure that fields of illumination of either individual or groups of emitter elements 115e do not significantly overlap, and yet provide a sufficiently large beam divergence of the light output from the emitter elements 115e to provide eye safety to observers.

The driver electronics 116 may each correspond to one or more emitter elements, and may each be operated responsive to timing control signals with reference to a master clock and/or power control signals that control the peak power of the light output by the emitter elements 115e. In some embodiments, each of the emitter elements 115e in the emitter array 115 is connected to and controlled by a respective driver circuit 116. In other embodiments, respective groups of emitter elements 115e in the emitter array 115 (e.g., emitter elements 115e in spatial proximity to each other), may be connected to a same driver circuit 116. The driver circuit or circuitry 116 may include one or more driver transistors configured to control the frequency, timing and amplitude of the optical emission signals that are output from the emitters 115e.

The emission of optical signals from multiple emitters 115e provides a single image frame for the flash lidar system 100. The maximum optical power output of the emitters 115e may be selected to generate a signal-to-noise ratio of the echo signal from the farthest, least reflective target at the brightest background illumination conditions that can be detected in accordance with embodiments described herein. An optional filter to control the emitted wavelengths of light and diffuser 114 to increase a field of illumination of the emitter array 115 are illustrated by way of example.

Light emission output from one or more of the emitters 115e impinges on and is reflected by one or more targets 150, and the reflected light is detected as an optical signal (also referred to herein as a return signal, echo signal, or echo) by one or more of the detectors 110d (e.g., via receiver optics 112), converted into an electrical signal representation (referred to herein as a detection signal), and processed (e.g., based on time of flight) to define a 3-D point cloud representation 170 of the field of view 190. Operations of lidar systems in accordance with embodiments of the present disclosure as described herein may be performed by one or more processors or controllers, such as the control circuit 105 of FIG. 1A.

In some embodiments, a receiver/detector module or circuit 110 includes an array of detector pixels (with each detector pixel including one or more detectors 110d, e.g., SPADs), receiver optics 112 (e.g., one or more lenses to collect light over the FoV 190), and receiver electronics (including timing circuit 106) that are configured to power, enable, and disable all or parts of the detector array 110 and to provide timing signals thereto. The detector pixels can be activated or deactivated with at least nanosecond precision, and may be individually addressable, addressable by group, and/or globally addressable.

The receiver optics 112 may include a macro lens that is configured to collect light from the largest FoV that can be imaged by the lidar system, microlenses to improve the collection efficiency of the detecting pixels, and/or anti-reflective coating to reduce or prevent detection of stray light. In some embodiments, a spectral filter 111 may be provided to pass or allow passage of 'signal' light (i.e., light of wavelengths corresponding to those of the optical signals output from the emitters) but substantially reject or prevent passage of non-signal light (i.e., light of wavelengths different than the optical signals output from the emitters).

The detectors 110d of the detector array 110 are connected to the timing circuit 106. The timing circuit 106 may be phase-locked to the driver circuitry 116 of the emitter array 115. The sensitivity of each of the detectors 110d or of groups of detectors may be controlled. For example, when the detector elements include reverse-biased photodiodes, avalanche photodiodes (APD), PIN diodes, and/or Geiger-mode Avalanche Diodes (SPADs), the reverse bias may be adjusted, whereby, the higher the overbias, the higher the sensitivity.

In some embodiments, a control circuit 105, such as a microcontroller or microprocessor, provides different emitter control signals to the driver circuitry 116 of different emitters 115e and/or provides different signals to the timing circuitry 106 of different detectors 110d to enable/disable the different detectors 110d so as to detect the echo signal from the target 150. The timing signals may define the frequency of operation of the detector(s) 110d, also referred to herein as the measurement frequency. The measurement frequency (or frequencies) of the detectors 110d may thus be based on the operating frequency (or frequencies) of the emitters 115e (e.g., the pulse repetition rate where the emission signal is a square wave or pulsed signal). The control circuit 105 may also control memory storage operations for storing data indicated by the detection signals in a non-transitory memory or memory array.

Figure 1B:
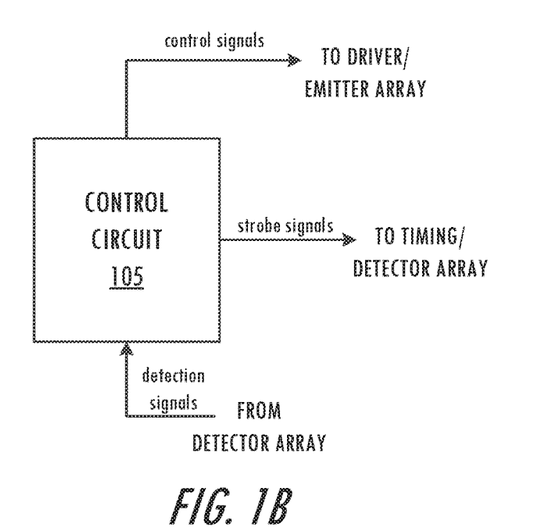
FIG. 1B is an example of a control circuit that generates emitter and/or detector control signals according to some embodiments described herein.

An example of a control circuit 105 that generates emitter and/or detector control signals is shown in FIG. 1B. The control circuit of FIG. 1B may represent one or more control circuits, for example, an emitter control circuit that is configured to provide the emitter control signals to the emitter array 115 and/or a detector control circuit that is configured to provide the detector control signals to the detector array 110 as described herein. Also, the control circuit 105 may include a sequencer circuit that is configured to coordinate operation of the emitters 115e and detectors 110d. More generally, the control circuit 105 may include one or more circuits that are configured to generate the respective detector signals that control the timing and/or durations of activation of the detectors 110d, and/or to generate respective emitter control signals that control the output of optical signals from the emitters 115e.

Operations of lidar systems in accordance with embodiments of the present invention, including measurement and calculation of a position of the target as described herein, may be performed by one or more processors or controllers, such as the control circuit shown in FIGS. 1A and/or 1B.

Some embodiments of the present disclosure are directed to indirect ToF systems, which may provide higher frame rates (e.g., due to lower raw data rates and a lower computational overhead) as compared to some direct ToF systems. Some iToF lidar systems operate by transmitting (from one or more emitters, e.g., defining an emitter unit), receiving (at one or more detectors, e.g., defining a detector pixel), and measuring (at one or more controllers/processors) the phase of optical signals at multiple (e.g., two) different measurement frequencies (e.g., with respect to emitter operation) and/or acquisition integration times (e.g., with respect to detector operation). For example, the emitters 115e of the lidar system 100 may emit a continuous modulated sinusoidal or square wave (i.e., pulsed) light signal at each of the multiple frequencies, and the phase shift of the echo signals received at the detectors 110d or detector pixels (that is, the phase difference between the emission signal and received echo signals) may be measured or calculated by the control circuit 105 based on the detection signals output from the detectors 110d. In some examples described herein, the emitters 115e emit optical signals as bursts of pulsed light (also referred as pulses), with each burst having a respective repetition rate/frequency and pulse width, with burst duration (e.g., in terms of number or cycles of pulses per burst) equal to or defining an acquisition or subframe of detector operation.

In some embodiments, phase data may be acquired by operating the emitters 115e phase-locked to a clock signal (e.g., a global clock signal) and operating the detector array 110 phase-locked to the emitter pulses, so as to integrate the echo signals at acquisition windows which are offset (e.g., relative to the global clock signal) by respective phase delays (e.g., zero, one-quarter, one-half, and three-quarters phase delays) of the emitter pulse cycle or frequency, also referred to herein as respective phase offsets. In other embodiments, phase data may be acquired by operating the detector array 110 phase-locked to a clock signal (e.g., a global clock signal) so as to integrate the echo signals at fixed acquisition windows, and operating the emitters 115e to emit optical signals in bursts of pulses that are offset (e.g., relative to the global clock signal) by the respective phase delays of the emitter pulse cycle or frequency. Each acquisition of multiple emitter pulse cycles in a burst corresponding to a respective phase delay or phase offset generates or defines a subframe.

For wide FoVs and high dynamic range lighting conditions, iToF systems may require collection of more subframes to accurately perform ranging measurements. In some embodiments, the detector acquisitions or subframes for the respective phase delays or phase offsets may include more emitter pulse cycles per burst (defining subframes with longer acquisition integration times), or fewer emitter pulse cycles per (defining subframes with shorter acquisition integration times). For example, the longer acquisition integration times (with more emitter pulses per burst at each phase offset) may improve detection of farther/less-reflective targets, while the shorter acquisition integration times (with fewer emitter pulses per burst at each phase offset) may reduce or avoid detector saturation in detection of nearer/more-reflective targets, thereby increasing the dynamic range of the system.

Following the acquisition and integration of all echo signals from a given burst of pulses and at a specific phase delay with respect to the emitter pulse cycle, a subframe signal including phase component data is generated for each detector pixel. The phases may be measured with a series of separate component measurements at the respective phase offsets, which correspond to "subframes" or sub-measurements of operation of the detector pixels. Embodiments are described by way of example herein with reference to four (0, 90, 180, and 270 degree (°)) component measurements or phase subframes, which collectively generate or define a frame of operation of the detector pixels for a respective measurement frequency and/or acquisition integration time. In some embodiments, component measurements at the respective phase offsets may be generated for each of a plurality of different measurement frequencies and/or each of a plurality of different acquisition integration times (e.g., four phase subframes with shorter acquisition integration times at each of two measurement frequencies, and four phase subframes with longer acquisition integration times at each of the two measurement frequencies). In some instances, the frame includes a fifth subframe (e.g., for background intensity detection and/or subtraction at a time when no echo signals are present) is also acquired in order to improve the fidelity of the reported 3D image. The results of these component measurements produce multiple (e.g., two) vector components (e.g., an X-component based on the 0° and 180° subframes, and a Y-component based on the 90° and 270° subframes), and the angle formed by these vector components is the vector phase.

The phases (as determined for the respective measurement frequencies and/or acquisition integration times) may each be related to the distance of the object contained in or imaged by the pixel, though they may change at different rates. However, the associated wavelengths of the measurement frequencies are typically shorter than the read range or imaging range, so the combination of two phases, one at each measurement frequency, can be used to uniquely identify the distance. That is, distance may be determined by analyzing respective signals at multiple (e.g., two) separate or distinct modulation or measurement frequencies and/or acquisition integration times, where each measurement frequency has a different unambiguous range, such that the true or actual location of the target may be indicated where the measurements at the different measurement frequencies agree or match. The phase delay of the returning light signal (after reflection by a target in the field of view) may be converted to distance using lookup tables (which correlate respective phase shift pairs to respective distance sub-ranges of an unambiguous range for two or more measurement frequencies), and/or using quadrature sampling techniques as described herein.

Some embodiments of the present invention may arise from recognition that disambiguation of target distance may be achieved by adding one or more additional subframes captured at different frequencies than the primary measurement frequencies so as to differentiate between potentially ambiguous distances.

As noted above, indirect ToF systems may illuminate a target with optical signals of a plurality of measurement frequencies so as to determine a distance to the target based on a phase of detected light that is reflected from the target. The phase delay of the returning light may be measured after it has been reflected by the targets in the scene. The phase delay may then be measured and converted to distance using a quadrature sampling technique. Indirect ToF systems may have high frame rate due to lower computation as compared to a direct ToF system.

Figure 2:
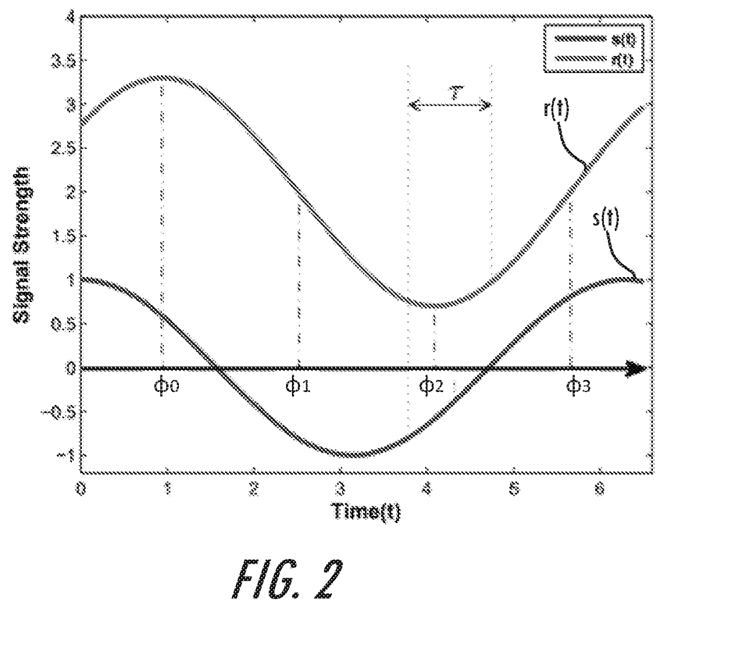
FIG. 2 is a graph illustrating an example calculation of phase delay in accordance with some embodiments of the present disclosure.

FIG. 2 is a graph illustrating an example calculation of phase delay in accordance with some embodiments of the present disclosure. The operations and equations discussed herein may be performed or calculated by a controller or processor, such as the control circuit 105 of FIGS. 1A and/or 1B. For example, for an optical emission signal with a modulation frequency of $f_m$, the sent signal s(t) (i.e., the optical signal output from one or more emitters 115e) and the received signal r(t) (i.e., the echo signal incident on one or more detectors 110d) as a function of time t with delay τ may be given by:

$$s(t) = \alpha \cos(2\pi f_m t) \quad \text{(Eqn 1)}$$

$$r(t) = A \cos(2\pi f_m (t-\tau)) + B \quad \text{(Eqn 2)}$$

where A and B are the unknown scale and offset of the reflected signal, respectively. For example, A is the amplitude of the received signal r(t) and may depend on the target's reflectivity and/or the detector's sensitivity. B may be due to ambient illumination associated with the operating environment. These parameters may be estimated at the emitter and/or control circuit. The cross-correlation for s(t) and r(t) may be:

$$c(\varphi) = \lim_{T \to \infty} \int_{-\frac{T}{2}}^{\frac{T}{2}} r(t)s(t+\varphi)dt = \frac{aA}{2}\cos(2\pi f_m \varphi + 2\pi f_m \tau) + B \quad \text{(Eqn 3)}$$

In Equation 3, amplitude A, offset B, and delay τ may be unknown. These variables can be solved by a four-component method described, for example, by R. P. Horaud, "A Short Tutorial on Three-Dimensional Cameras," April 2013. In the four-component method, four equidistant samples (also referred to herein as four phase subframes) may be captured at locations (φ0, φ1, φ2, φ3; also referred to herein as component measurements D0, D1, D2, D3) within a modulation cycle as illustrated in the graph of FIG. 2.

The cross correlations of these four outputs with the source signal s(t) can be denoted by c(φ0), c(φ1), c(φ2), c(φ3). The three unknown variables can be calculated based on these correlations. The amplitude A can be calculated as:

$$A = \frac{\sqrt{[c(\varphi 3) - c(\varphi 1)]^2 + [c(\varphi 0) - c(\varphi 2)]^2}}{2}. \quad \text{(Eqn 4)}$$

The offset B may be attributed to background illumination and can be calculated as:

$$B = \frac{c(\varphi 0) + c(\varphi 1) + c(\varphi 2) + c(\varphi 3)}{4}. \quad \text{(Eqn 5)}$$

The delay τ is the time of flight for light sent from the emitter, reflected from the target's surface, and received by the ToF detector and can be calculated as:

$$\tau = \arctan\left[\frac{c(\varphi 3) - c(\varphi 1)}{c(\varphi 0) - c(\varphi 2)}\right] \quad \text{(Eqn 6)}$$

The value of τ is proportional to the range or distance d between the ToF system and the illuminated target as τ=2d/c, where c is the speed of light. Then the delayed phase between s(t) and r(t) can be denoted as φ=2πf$_m$τ=2πf$_m$(2d/c). Since φ ranges from (0, 2π], the measured distance d reaches its maximum unambiguous range UR when φ=2π. For an emitter operating at f$_m$=15 MHz, the unambiguous range would be 10 m.

For square wave or pulsed optical emission signals, the measurement frequency may refer to the pulse repetition rate, for example, for a burst of pulses. In some embodiments, combinations of multiple measurement frequencies may be used to increase the unambiguous range. The four phase measurements may be taken for each of the multiple different measurement frequencies (e.g., for two primary measurement frequencies, eight measurements, or subframes, may be taken in a frame). For example, an optical system may use phase measurements taken from optical signals operating at a plurality of (e.g., two) measurement frequencies (e.g., approximately 18 and 21 MHz). By using two measurement frequencies, the unambiguous range may be increased based on the difference between the two measurement frequencies, but with a relatively high resolution. For example, with two frequencies operating at 18 MHz and 21 MHz, the unambiguous range UR may be defined as c/2fm. Thus, for a frequency difference fm=3 MHz, UR=c/2fm=3×10$^8$/2(3,000,000)=50 m, which would match the unambiguous range of a 3 MHz system. However, the system operating at operating at 18 MHz and 21 MHz would be capable of higher resolution due to the higher frequency light as compared to the 3 MHz system.

The frequency (or frequencies) selected for an iToF system may impact operation of the iToF system. For example, range calculation in systems using low modulation frequencies may be susceptible to phase noise. A given phase error may be translated to a larger range error if the modulation frequency is low. In contrast, a system using a plurality of higher frequencies may operate at a higher readout (aka frame) rate, which may result in a system with more complicated electronics. In addition, for each subframe readout in a multiple frequency system, various noise sources (e.g., read noise, quantization noise) may need to be managed. As a result, the more frequencies that are used, the higher the required average optical power of the system, which may be undesirable. Therefore a trade-off may exist between using a combination of high frequencies to reduce phase noise/phase errors and using a low frequency to increase range.

As discussed herein, due to range rollover past the unambiguous range, targets that are farther than 50 m from the ToF system may be indicated as being within the 50 m range. One potential solution may be to use a frequency pair that has a narrower frequency separation to get a longer unambiguous range. However, this solution may lead to either lower resolution and/or range splitting. Range splitting may occur because, when a measurement is sufficiently noisy, the assignment of distance from phase can be incorrect. When the noise is low, only a small amount of range error may be present, but when noise is sufficiently high, the error can be off by meters. In such a case, the measured ranges are not continuous, and may exhibit splitting (i.e., repeated measurements of the same measured point may not return a Gaussian distribution of distances, but one with several peaks). The choice of frequencies used may effect how susceptible a measurement is to this effect, but comes with other tradeoffs such as a different unambiguous range or measurement precision.

Another potential solution includes the addition of more frequencies (e.g., greater than two frequencies) as part of the full processing of the target to further increase the unambiguous range. However, the use of additional frequencies (and the associated measurements) may have the potential effects of slowing the frame rate/increasing the frame time, creating a longer integration time, and/or increasing the power usage.

In the example lidar system 100 of FIGS. 1A and/or 1B, the control circuit 105 may include a pixel processor that outputs emitter control signals and detector control signals to the emitter array 115 and detector array 110 to control the emission of the optical signals and the detection of the reflective optical signals, respectively. The control circuit 105 calculates the distance to the target 150 by measuring the phase delay or phase shift of an illumination pulse (or the aggregate of multiple illumination pulses) over the journey from the emitter array 115 to a target 150 and back to the detector array 110 (i.e., the difference in phase between the optical signal emitted by the emitter array 115 and the reflected optical signal or echo received at the detector array 110, as indicated by the respective detection signals output from the detector array 110). Portions or an entirety of the control circuits described herein may be integrated in the emitter array 115 and/or detector array 110 in some embodiments. Although illustrated with reference to a flash lidar system, it will be understood that embodiments described herein may include non-flash or scanning (also referred to as "line scanning" or "point scanning" without loss of generality to other types of scanning) lidar systems as well.

In some embodiments, for each of the modulation or measurement frequencies of the optical signals output by the emitter array 115, the control circuit 105 may perform a phase measurement that is based on multiple component measurements (referred to herein with reference to four phase vector component measurements, D0, D1, D2, D3) indicative of the different phases of the detection signals output from the detector array 110. The respective phase vector component measurements D0, D1, D2, and D3 may be considered as samples of the returning echo signals that are taken at respective phase offsets (e.g., at 0°, 90°, 180°, and 270° phase delays) with respect to a chip reference signal for the detector array 110. It will be understood that the description herein with reference to four measurements, D0, D1, D2, and D3 with phase offsets of 0°, 90°, 180°, and 270° is by way of example only, and that embodiments of the present disclosure may utilize fewer or more component measurements at these or other phase offsets for distance or range calculation.

More particularly, each of the detector elements 110d of the detector array 110 is connected to a timing circuit 106. The timing circuit 106 may be phase-locked to the driver circuitry 116 of the emitter array 115. The timing of operation and sensitivity of each of the detector elements 110d or of groups of detector elements 110d may be controlled by the timing circuit 106. The timing circuit 106 may operate respective detector pixels (including one or more detector elements 110d) of the detector array 110 to sample the echo signals at respective phase offsets (e.g., 90°, 180°, 270°) corresponding to the respective phase measurement subframes. As such, each of the detection signals output from the detector array 110 may be indicative of a phase measurement including multiple phase vector component measurements D0, D1, D2, D3 sampled at phase offsets 0°, 90°, 180°, 270°, respectively, for a respective measurement frequency $f_m$ where the component measurements determined from each detection signal define a respective phase vector.

In some embodiments, a detector element 110d or detector pixel of a detector array 110 may include first and second accumulator wells, with each well being alternately activated by the control circuit 105 or associated timing circuit 106 based on the measurement frequency $f_m$ to detect incident photons for respective portions (or subframes) of each phase measurement (or frame). In some embodiments, operation of the emitter elements 115 may be based on a global clock signal, with operation of the accumulator wells of the detector pixels being offset at respective phase delays or phase offsets relative to the global clock signal In some embodiments, operation of the accumulator wells of the detector pixels may be based on the global clock signals, with operation of the emitters 115 being offset at respective phase delays or phase offsets relative to the global clock signal.

Each subframe may represent the aggregated returns (e.g., the integrated intensity c(x) of the detected charges) over multiple (e.g., tens or hundreds or thousands) pulses of the optical signals output by the emitters 115e, and may be delayed or "shifted" (relative to one another) based on a fraction (e.g., ¼) of the period defined by the respective measurement frequency $f_m$ (where the period=$1/f_m$). For example, in measurement of the 0 degree subframe, the accumulator wells may be activated to collect data for the period corresponding to the measurement frequency for tens or hundreds or thousands of cycles of the optical signals, with similar operation of the detector(s) being shifted in time by one-quarter of the period corresponding to the measurement frequency for each of the remaining 90, 180, and 270 degree subframes.

For instance, for an optical signal emitted from the emitter array 115 at a measurement frequency of 20 MHz (and thus, a period of 50 nanoseconds (ns)), measurement of the 0° subframe may include activation of a first accumulator well of a detector 110d for time range of 0 ns to 25 ns (e.g., half of the 50 ns period), and activation of a second accumulator well of the detector 110d for time range 25 ns to 50 ns (e.g., the other half of the 50 ns period), for tens or hundreds or thousands of cycles of the optical signal. The timing of activation of the first and second accumulator wells may each be likewise shifted or offset by 12.5 ns (e.g., one-quarter of the 50 ns period) for measurement of each subsequent subframe (e.g., 90°, 180°, 270°) of a phase measurement. For example lidar systems as described herein using two measurement frequencies, distance may be measured using eight subframes (i.e., four component measurements or phase subframes at each of the two measurement frequencies).

As noted above, a phase measurement for each measurement frequency may be taken by operating the detector array 110 so as to output detection signals from which a series of separate component measurements, which may correspond to subframes of operation of the detectors 110d, may be determined. Each subframe may thus be a measurement of a phase component that is 0, 90, 180, or 270 degrees out of phase (or offset) with respect to a reference optical signal pulse or other reference signal, with operation of the detector(s) 110d being shifted by one-quarter of the period corresponding to the measurement frequency for each of the four subframes.

Embodiments herein are described by way of example with reference to a detector phase measurement including four subframes with phase component measurements D0, D1, D2, D3 taken at 0, 90, 180, 270 degree phase delays, respectively, but the present invention is not limited to these examples. The signals D0 and D2 measured in the 0° and 180° subframes are correlated, as are the signals D1 and D3 measured in the 90° and 270° subframes. For example, for a static scene, the signals D0 and D2 measured in the 0° and 180° subframes may be equal and opposite, and the signals D1 and D3 measured in the 90° and 270° subframes may be equal and opposite. In some embodiments, the use of correlated component measurements (e.g., D0 and D2; D1 and D3) may compensate for differences or asymmetries in the electrode structures of the first and second accumulator wells in each detector pixel, with each component measurement indicating a charge difference between the accumulator wells.

Figure 3:
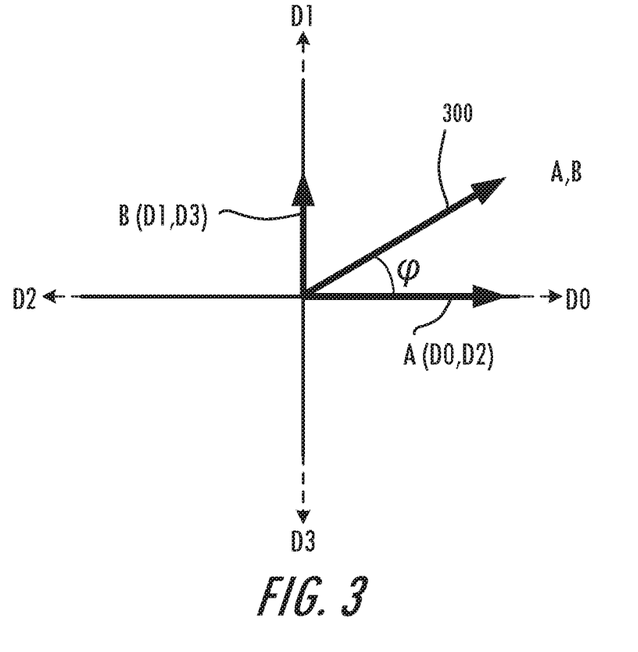
FIG. 3 is a graph illustrating the calculation of a phase vector of a plurality of signal measurements in accordance with embodiments of the present disclosure.

As illustrated in FIG. 3, the two pairs of signals for a given measurement frequency can be thought of the X and Y components of a phase vector. Referring to the diagram of FIG. 3, the phase component measurements from each detection signal represent multiple (e.g., two orthogonal) vector components A, B defining a phase vector 300. In rectangular form, the data D0 and D2 measured in the 0° and 180° subframes define horizontal (or X-) components of the vector 300, and can be combined (e.g., by vector addition) in a single data channel A. The data D1 and D3 measured in the 90° and 270° subframes define vertical (or Y-) components of the vector 300, and can be likewise combined in a single data channel B. In other words, the first vector component A (e.g., from the 0° and 180° subframe measurements) may represent a horizontal/X-component, and the second vector component B (e.g., from the 90° and 270° subframe measurements) may represent a vertical/Y-component. The vector phase of a received detection signal for each measurement frequency (and/or acquisition integration time) may be the angle $\varphi$ defined by the vector A,B represented by the component measurements. That is, the two pairs of component measurements (the 0°, 180° components D0, D2 and the 90°, 270° components D1, D3) for a measurement frequency may be combined into horizontal (X-) and vertical (Y-) components, respectively, of a phase vector 300 for that measurement frequency, with the angle $\varphi$ formed by these components being the vector phase.

As can be seen from FIG. 3 (and from geometry), by way of example, the 90 degree measurement (e.g., the D1 measurement) has the property that it takes positive values when the phase of the received optical signal is between 0 and 180 degrees, and the 90 degree measurement has negative values when the phase of the received optical signal is from 180 to 360 degrees.

By leveraging this feature of the phase measurements, additional information about the actual range of the target may be derived through the use of a single additional subframe at a disambiguation frequency. For example, a single additional 90 degree subframe measurement may be taken at a disambiguation frequency having a higher unambiguous range than the primary measurement frequency. As an example, an additional 90 degree phase measurement may be taken at a disambiguation frequency of 1.5 MHz, which would have a 100 m unambiguous range, though the present invention is not limited thereto.

The return signal from the disambiguation frequency can be measured. The resulting value of the single subframe taken at the disambiguation frequency may be analyzed. As can be seen from FIG. 3, when the resulting value is positive (e.g., in the upper half of the graph), the target is within the first half of the unambiguous range associated with the disambiguation frequency. For example, if a 1.5 MHz signal is used having a 100 m unambiguous range, then the target would be in the first 50 m. When the resulting value is negative (e.g., in the lower half of the graph), the target may be within the second half of the unambiguous range associated with the disambiguation frequency. For example, if a 1.5 MHz signal is used having a 100 m unambiguous range, then the target would be between 50 m and 100 m. This additional data may assist in disambiguating the range returned from the initial four subframes of the primary measurement or modulation frequencies.

In some embodiments, a lidar system may have or experience additional system delays, some of which may vary per detector pixel. Such delays may contribute to phase noise and/or variations in the values taken at the measurement frequencies. Thus, positive and negative measurement values at the disambiguation frequency may not necessarily line up with specific theoretical distance ranges (e.g., where positive is 0-50 m and negative is 50-100 m). However, even with variations in the measurements, the embodiments described herein are still capable of determining contiguous ranges for positive and negative values. In some embodiments, calibration may be used to determine the positive and negative ranges associated with various frequency measurements. For example, using the values discussed previously, calibration may determine that positive values may be associated with 0-20 m and 70-100 m, and may determine that negative values may be associated with 20-70 m. Even with such variation, the distance may still be unambiguously determined in terms of the third frequency measurement at the disambiguation frequency to the equivalent distance within the unambiguous range of the disambiguation frequency (e.g., within a 50 m portion of a 100 m unambiguous range). In addition or as an alternative to calibration, some embodiments may utilize a variable delay line per detector element so as to compensate for a phase offset due to the system delays.

As previously discussed, the use of the four subframes of the primary measurements per primary measurement frequency may result in an estimated target distance that may correspond to a plurality of actual distances, due to range rollover. The use of the disambiguation frequency may allow for certain ones of the plurality of actual distances to be ruled out. For example, the additional data provided by the disambiguation frequency may be used to disambiguate a detected range of 10m from a system with an unambiguous range of 50 m. As discussed herein, the actual range for such a system may be 10 m or 60 m or 110 m, etc. By utilizing the disambiguation subframe, the data can be further narrowed to 10 m (if the disambiguation result is positive), 60 m (if the disambiguation result is negative), or further (in the case for the disambiguation frequency itself has gone beyond its unambiguous range). While the distances may be theoretically farther, the practical result of a lidar system may be that the actual range can be determined when ranges outside the limits of the emitter/detectors are excluded. For example, if the system is unable to detect targets beyond 100 m, then the disambiguation example provided above can definitively determine the actual range to the target.

Though range rollover may still occur with the disambiguation frequency, the disambiguation frequency may be selected such that the information returned from the single subframe is sufficient to accurately determine the target distance. For example, the 100 m unambiguous range of a 1.5 MHz optical signal may be sufficient for ToF systems of particular power levels, because even the most reflective possible target, if more than 100 m away, may not be detected by the detector array. In some embodiments, the size, brightness, and/or shape of the reflected target may be further analyzed (e.g., as determined by the primary frequencies) to infer the distance beyond the unambiguous range of the disambiguation frequency. In some embodiments, additional subframes at additional disambiguation frequencies may be used to further clarify the target's range. Thus, a frame may include a plurality of subframes at the primary measurement frequency (e.g., four subframes each) plus one (or more) subframes at one or more disambiguation frequencies.

Figure 4:
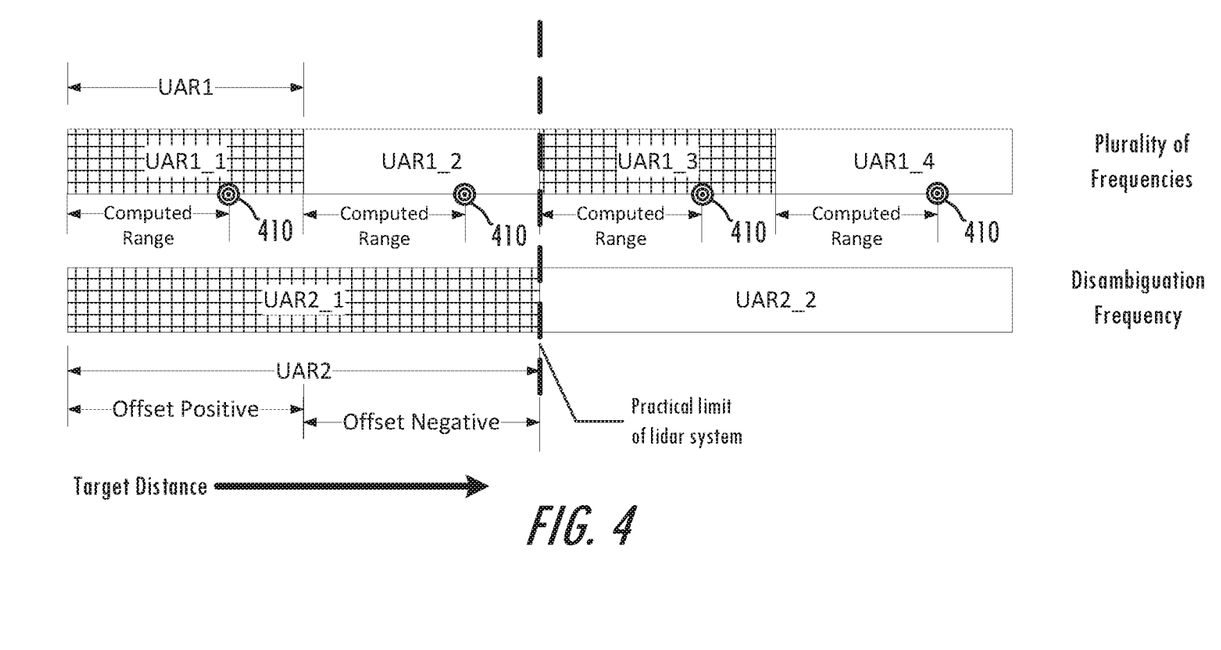
FIG. 4 is a schematic diagram illustrating the use of a disambiguation frequency in accordance with embodiments of the present disclosure.

FIG. 4 is a schematic diagram illustrating the use of a disambiguation frequency in accordance with embodiments of the present disclosure. Referring to FIG. 4, light having a plurality of frequencies may be utilized to detect a range to a target. The plurality of frequencies may be associated with a first unambiguous range UAR1. Because of range rollover, the actual distance to the target may be in one of several actual distance ranges UAR1_1, UAR1_2, UAR1_3, UAR1_4, etc. In practice, however, the actual distance to the target may be within UAR1_1 and UAR1_2. For example, if the UAR1 was 50 m, the practical distance that might be detected by the lidar system may be 100 m.

Referring to FIG. 4, light having the disambiguation frequency may be utilized to detect a reduced set of subframes. For example, a single subframe at a single offset may be detected to determine a component measurement. The disambiguation frequency may be associated with a second unambiguous range UAR2. The second unambiguous range UAR2 may be greater than the first unambiguous range UAR1. The detected component measurement may be analyzed to determine if it is positive or negative. As illustrated in FIG. 4, a positive offset may indicate that the range is within a first half of the second unambiguous range UAR2, which may correspond to the first instance of the first unambiguous range UAR1_1. A negative offset may indicate that the range is within a second half of the second unambiguous range UAR2, which may correspond to the second instance of the first unambiguous range UAR1_2. In some embodiments, the lidar system may ignore distances that might be beyond the practical limit of the lidar system. In some embodiments, other aspects of the detection signals may be utilized to determine whether the actual range is within one of distances associated with a range rollover of the disambiguation frequency (e.g., UAR2_2 or beyond).

For example, if the primary measurement frequencies are 18 and 21 MHz, the resulting measurement has an unambiguous range of 50 m. Thus, for the same measurement, the target could be within the first 50 m from the ToF system or in some area beyond 50 m. If a single 90 degree phase disambiguation subframe is used at a disambiguation frequency of 1.5 MHz, which has a 100 m unambiguous range, the resulting measurement may be used to determine if the target is in the first 50 m or beyond the first 50 m. If the value returned from the disambiguation subframe is positive (e.g., in the upper half of the phase graph), the target may be determined to be within the first 50 m (half of the unambiguous range of the 1.5 MHz signal) of the unambiguous range of the four subframes collected at 18 MHz and 21 MHz. When the value returned from the disambiguation subframe is negative, the target will be beyond the first 50 meters.

This allows the ability to disambiguate the first half of the unambiguous range (e.g., the first 50 m) of the primary frequencies from beyond the first half with only a single extra subframe of data. This is greatly reduced from the conventional four subframes per frequency that would be used if complete processing was performed using an additional primary measurement frequency (e.g., a third measurement frequency, in the example above). This is both time and power efficient, with minimal loss in precision.

Though the disambiguation frequency discussed above is half of the range between the two primary measurement frequencies, the present invention is not limited thereto. In some embodiments, different frequencies may be used as the disambiguation frequency. In some embodiments, the measurement of one (or more) disambiguation frequencies may be used to produce additional disambiguation information. This measurement may come in the form of one or more phase measurements. In some embodiments, lookup tables of phase vs. distance may be used that allow unambiguous ranging past the distances allowed by only a pair of frequencies. In some embodiments, a higher disambiguation frequency may be used than the measurement frequency (or frequencies) but the disambiguation frequency may be selected such that both phases are positive between zero and some angle $0\Theta$, but only the measurement frequency is positive between $2\pi$ and $(2\pi+\Theta)$. Thus, the range of the system may be extended. In some embodiments, a phase shift may be applied between the signals of the disambiguation frequency and the signals of the measurement frequency (or frequencies) in order to disambiguate the range of the target.

In some embodiments, one or more disambiguation frequencies may be used that have a higher unambiguous range than the unambiguous range of the combination of primary measurement frequencies used in the primary phase detection subframes. For example, the disambiguation frequency may be less than a delta (e.g., a difference) between the primary measurement frequencies. With the use of other frequencies, the placement of the target within the unambiguous range of the disambiguation frequency may assist in disambiguating the target within the unambiguous ranges of the primary frequencies. Moreover, more than one frequency may be used as the disambiguation frequency. Thus, one or more subframe measurements of two or more disambiguation frequencies may be used to disambiguate a measurement taken at one or more primary frequencies.

Similarly, though a 90 degree phase measurement is listed for the subframe of the disambiguation frequency, it will be understood that other phase measurements could be used with appropriate adjustment. For example, the 270 degree phase offset could be used and the placement of the target within the unambiguous ranged could be determined based on the opposite portions (positive or negative) of the graph as discussed herein with respect to the 90 degree phase offset. Other phase offsets could be used as well, with appropriate adjustments based on the phase offset's relation to the unambiguous ranges of the primary frequencies. More generally, an additional phase measurement at a different frequency than the primary measurement frequencies may be used to distinguish in which half of the unambiguous range of the primary measurement frequencies the target is located.

Figure 5:
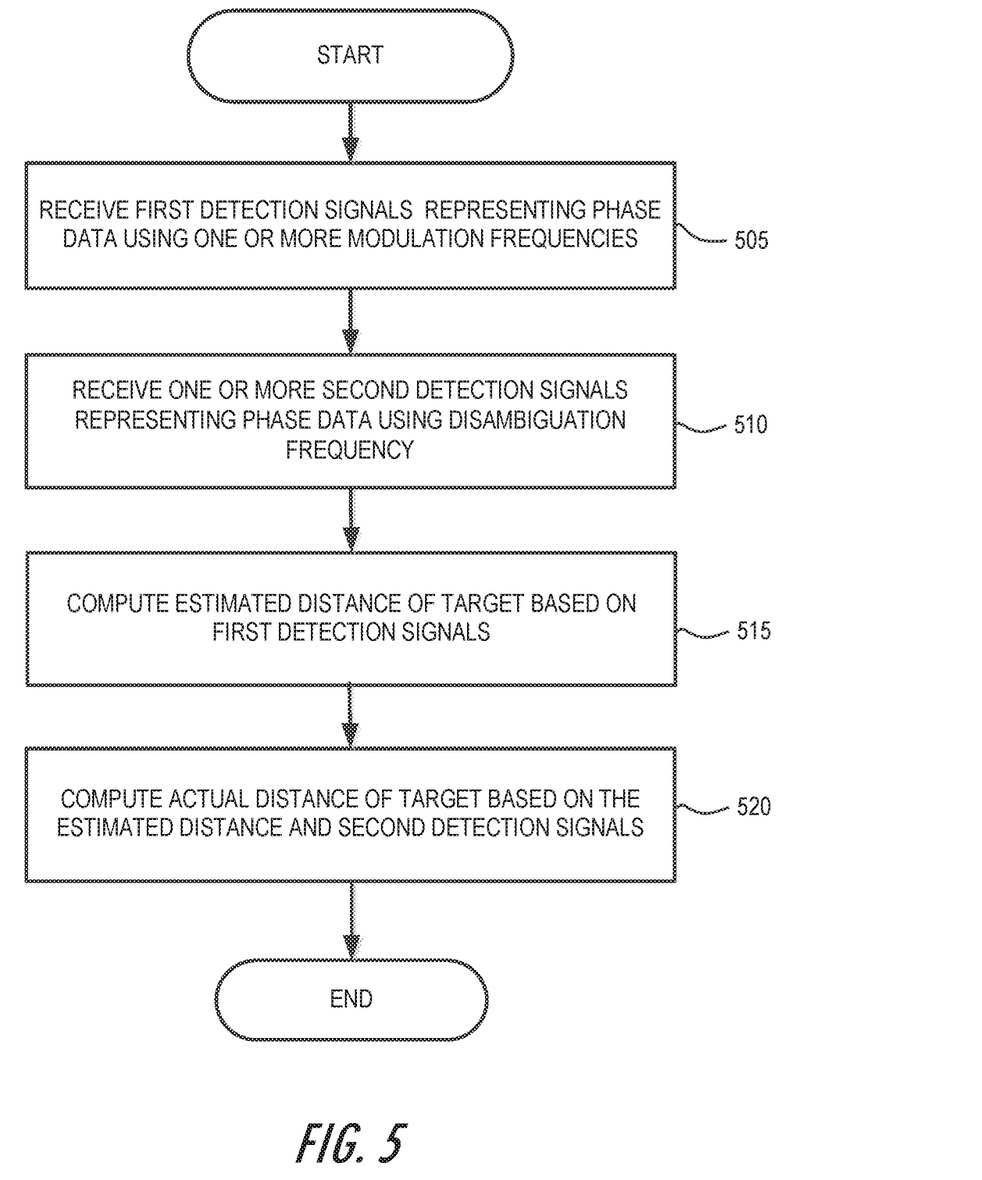
FIG. 5 is a flowchart illustrating operations for disambiguating a distance to a target in accordance with embodiments of the present disclosure.

Some embodiments described herein may provide circuits or systems that correct distance or range measurements based on subframe measurements performed at a disambiguation frequency. FIG. 5 is a flowchart illustrating example operations for disambiguating a distance to a target in accordance with embodiments of the present disclosure. The operations of FIG. 5 may be performed by a processor or control circuit, such as the control circuit 105 of FIGS. 1A and 1B.

Referring to FIG. 5, first detection signals including respective component measurements representing phase data for an object or target that is illuminated by optical emission signals from one or more emitters 115e are output by one or more detector pixels of the detector array 110 and are received by the control circuit 105 (block 505). The first detection signals may be a first subset of signals output by the one or more detector pixels of the detector array 110. In some embodiments, the first subset of detection signals may be associated with one or more frequencies of light emitted by the one or more emitters 115e. In some embodiments, the one or more frequencies of light may be associated with a first unambiguous range. The first unambiguous range may indicate a maximum range that may be determined by the lidar system before the range wraps (e.g., range rollover), as described herein. The phase data of the first detection signals may represent a phase shift of the first detection signals (relative to the timing of the emission signals and/or a chip reference signal for the detector array 110), and may be represented by the separate component measurements in each detection signal. The actual phase for each of the detection signals include multiple component measurements D0, D1, D2, D3 that define respective phase vectors.

The component measurements D0, D1, D2, D3 for each of the phase vectors are sampled at phase offsets (e.g., 0°, 90°, 180°, and 270°) corresponding to respective subframes of operation of the detectors, as shown in FIG. 3. This detection of the component measurements may be performed, for example, responsive to emission signals at a first frequency and responsive to emission signals at a second frequency. Thus, a first set of phase offset measurements (e.g., subframes) may be performed corresponding to light emitted by the detectors pixels of the detector array 110 at the first frequency of the plurality of frequencies, and a second set of phase offset measurements (e.g., subframes) may be performed corresponding to light emitted at the second frequency of the plurality of frequencies. The example of FIG. 5 is described with reference to the eight subframes (four component measurements/subframes at each of two measurement frequencies) discussed above, but it will be understood that embodiments of the present disclosure are not so limited.

Referring to FIG. 5, one or more second detection signals including respective component measurements representing phase data for an object or target that is illuminated by optical emission signals from one or more emitters 115e are output by one or more detector pixels of the detector array 110 and are received by the control circuit 105 (block 510).

The second detection signals may be a second subset of signals output by the one or more detector pixels of the detector array 110. In some embodiments, the second subset of detection signals may be associated with a disambiguation frequency of light emitted by the one or more emitters 115e. In some embodiments, the disambiguation frequency may be different from the plurality of frequencies (e.g., the first and second frequencies) corresponding to the first subset of detection signals. In some embodiments, the disambiguation frequency may be less than a difference between the first and second frequencies.

In some embodiments, the disambiguation frequency of light may be associated with a second unambiguous range. The second unambiguous range may be greater than the first unambiguous range. The phase data of the second detection signals may represent a phase shift of the second detection signals (relative to the timing of the emission signals and/or a chip reference signal for the detector array 110). In some embodiments, the second detection signals may be associated with a single component measurement (e.g., D0, D1, D2, or D3) that define a phase vector sample at a particular phase offset (e.g., 0°, 90°, 180°, or 270°), though the present invention is not limited thereto. In some embodiments, the second detection signals may include multiple component measurements D0, D1, D2, D3 that define respective phase vectors at more than one phase offset (e.g., 0°, 90°, 180°, and 270°). In some embodiments, the second detections signals may have or be associated with fewer component measurements than the first detections signals.

In some embodiments, the first detection signals may represent four subframes at the first frequency (including component measurements at four phase offsets, such as 0°, 90°, 180°, and 270°) and four subframes at the second frequency (including component measurements at four phase offset, such as 0°, 90°, 180°, and 270°). In some embodiments, the second detection signals may represent a single subframe at the disambiguation frequency (including component measurements at a phase offset such as 0°, 90°, 180°, or 270°).

Using the first detection signals (e.g., from the first subset of detection signals associated with the plurality of frequencies), an estimated distance to the target may be computed (block 515). Calculating the estimated distance may be performed, for example, by control circuit 105 discussed herein with respect to FIGS. 1A and 1B. The estimated distance to the target may be calculated based on the measured phase offsets of the first detection signals utilizing, for example, techniques as described herein. However, as also described herein, the estimated distance may be subject to the unambiguous range of the plurality of frequencies. In other words, the estimated distance may actually indicate at least two potential distances to the target. As illustrated in FIG. 4, the computed range associated with the estimated distance may render a plurality of potential target distances 410 due to range rollover beyond the first unambiguous range UAR1.

Accordingly, the second detection signals associated with the disambiguation frequency may be used to disambiguate the estimate distance that was calculated based on the first detection signals. The actual distance to the target may be computed based on the estimated distance and the second detection signals (block 520). For example, control circuit 105 may analyze the second detection signals associated with the disambiguation frequency to determine a sign of the phase vector returned by the second detection signals. For example, if the sign of the phase vector associated with the second detection signals indicates that the target is within the first half of the second unambiguous range (e.g., if the phase vector is positive for a 90° phase offset measurement), the actual distance to the target may be determined to be within a first instance of the first unambiguous range of the first detection signals. For example, as illustrated in FIG. 4, the actual distance may be determined to be within a first unambiguous range of the first detection signals. In other words, the actual distance to the target may be the same as the computed distance based on the first detection signals. As an example, if the first unambiguous range of the first detection signals was 50 m and the computed distance to the target was 42 m, the actual distance to the target would be 42 m.

Alternatively, if the sign of the phase vector associated with the second detection signals indicates that the target is within the second half of the second unambiguous range (e.g., if the phase vector is negative for a 90° phase offset measurement), the actual distance to the target may be determined to be within a multiple of the first unambiguous range of the first detection signals. For example, as illustrated in FIG. 4, the actual distance may be determined to be within a second instance of the first unambiguous range of the first detection signals. In other words, the actual distance to the target may be the same as the computed distance based on the first detection signals plus the first unambiguous range of the first detection signals. As an example, if the unambiguous range of the first detection signals was 50 m and the computed distance to the target was 42 m, the actual distance to the target would be calculated as 92 m (50 m+42 m).

Though the disambiguation of the computed distance to the target is illustrated with reference to an example that utilizes a 90° phase offset component measurement, it will be understood that other component measurements are possible with out deviating from the present disclosure. For example, the phase offset measurement could be taken at a 270° phase offset. In such an example, the actual distance to the target may be determined to be within the first half of the second unambiguous range associated with the disambiguation frequency if the component measurement has a negative phase vector, and within the second half of the second unambiguous range associated with the disambiguation frequency if the component measurement has a positive phase vector. In general, embodiments described herein may bin any ranges into positive or negative ranges, such that the range locations of bins are less important than the location within the overall range (e.g., positive or negative with respect to the phase vector measurement).

The use of the disambiguation frequency may allow for more accurate distance measurement without the need for multiple additional subframes and calculations that may be required by the addition of a full complement of phase measurements at additional frequencies. In addition, since the disambiguation method described herein may be based on a determination of just the sign or polarity of the magnitude of a single subframe (e.g., whether the measurement is positive or negative), the underlying determination for the disambiguation operation may be much simpler and quicker than methods which utilize a full phase-based analysis.

Various embodiments have been described herein with reference to the accompanying drawings in which example embodiments are shown. These embodiments may, however, be embodied in different forms and should not be construed as limited to the embodiments set forth herein. Rather, these embodiments are provided so that this disclosure is thorough and complete and fully conveys the inventive concept to those skilled in the art. Various modifications to the example embodiments and the generic principles and features described herein will be readily apparent. In the drawings, the sizes and relative sizes of layers and regions are not shown to scale, and in some instances may be exaggerated for clarity.

The example embodiments are mainly described in terms of particular methods and devices provided in particular implementations. However, the methods and devices may operate effectively in other implementations. Phrases such as "some embodiments," "one embodiment," and "another embodiment" may refer to the same or different embodiments as well as to multiple embodiments. The embodiments will be described with respect to systems and/or devices having certain components. However, the systems and/or devices may include fewer or additional components than those shown, and variations in the arrangement and type of the components may be made without departing from the scope of the inventive concepts. The example embodiments will also be described in the context of particular methods having certain steps or operations. However, the methods and devices may operate effectively for other methods having different and/or additional steps/operations and steps/operations in different orders that are not inconsistent with the example embodiments. Thus, the present inventive concepts are not intended to be limited to the embodiments shown, but are to be accorded the widest scope consistent with the principles and features described herein.

It will be understood that when an element is referred to or illustrated as being "on," "connected," or "coupled" to another element, it can be directly on, connected, or coupled to the other element, or intervening elements may be present. In contrast, when an element is referred to as being "directly on," "directly connected," or "directly coupled" to another element, there are no intervening elements present.

It will also be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the present invention.

Furthermore, relative terms, such as "lower" or "bottom" and "upper" or "top," may be used herein to describe one element's relationship to another element as illustrated in the Figures. It will be understood that relative terms are intended to encompass different orientations of the device in addition to the orientation depicted in the Figures. For example, if the device in one of the figures is turned over, elements described as being on the "lower" side of other elements would then be oriented on "upper" sides of the other elements. The exemplary term "lower," can therefore, encompasses both an orientation of "lower" and "upper," depending of the particular orientation of the figure. Similarly, if the device in one of the figures is turned over, elements described as "below" or "beneath" other elements would then be oriented "above" the other elements. The exemplary terms "below" or "beneath" can, therefore, encompass both an orientation of above and below.

The terminology used in the description of the invention herein is for the purpose of describing particular embodiments only and is not intended to be limiting of the invention. As used in the description of the invention and the appended claims, the singular forms "a," "an," and "the" are intended to include the plural forms as well, unless the context clearly indicates otherwise.

It will also be understood that the term "and/or" as used herein refers to and encompasses any and all possible combinations of one or more of the associated listed items. It will be further understood that the terms "include," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

Embodiments of the invention are described herein with reference to illustrations that are schematic illustrations of idealized embodiments (and intermediate structures) of the invention. As such, variations from the shapes of the illustrations as a result, for example, of manufacturing techniques and/or tolerances, are to be expected. Thus, the regions illustrated in the figures are schematic in nature and their shapes are not intended to illustrate the actual shape of a region of a device and are not intended to limit the scope of the invention.

Unless otherwise defined, all terms used in disclosing embodiments of the invention, including technical and scientific terms, have the same meaning as commonly understood by one of ordinary skill in the art to which this invention belongs, and are not necessarily limited to the specific definitions known at the time of the present invention being described. Accordingly, these terms can include equivalent terms that are created after such time. It will be further understood that terms, such as those defined in commonly used dictionaries, should be interpreted as having a meaning that is consistent with their meaning in the present specification and in the context of the relevant art and will not be interpreted in an idealized or overly formal sense unless expressly so defined herein. All publications, patent applications, patents, and other references mentioned herein are incorporated by reference in their entireties.

Many different embodiments have been disclosed herein, in connection with the above description and the drawings. It will be understood that it would be unduly repetitious and obfuscating to literally describe and illustrate every combination and subcombination of these embodiments. Accordingly, the present specification, including the drawings, shall be construed to constitute a complete written description of all combinations and subcombinations of the embodiments of the present invention described herein, and of the manner and process of making and using them, and shall support claims to any such combination or subcombination.

Although the invention has been described herein with reference to various embodiments, it will be appreciated that further variations and modifications may be made within the scope and spirit of the principles of the invention. Although specific terms are employed, they are used in a generic and descriptive sense only and not for purposes of limitation.

The invention claimed is:

1. A Time of Flight (ToF) system, comprising:
   one or more optical elements configured to emit optical signals at two or more measurement frequencies and at least one disambiguation frequency;
   a detector array comprising a plurality of detectors that are configured to output respective detection signals responsive to light provided thereto; and
   a circuit configured to control the detector array to obtain a first subset of the detection signals at a first plurality of phase offsets corresponding to the two or more measurement frequencies and to obtain a second subset of the detection signals at a second plurality of phase offsets corresponding to the at least one disambiguation frequency, wherein the second plurality comprises fewer phase offsets than the first plurality,
   wherein the at least one disambiguation frequency is less than a difference between the two or more measurement frequencies.

2. The ToF system of claim 1, wherein the circuit is configured to determine a plurality of potential distances for a target illuminated by the optical signals based on the first subset of the detection signals, and to identify a subset of plurality of potential distances based on the second subset of the detection signals.

3. The ToF system of claim 1, wherein the at least one disambiguation frequency comprises two or more frequencies.

4. The ToF system of claim 1, wherein the first subset and the second subset collectively define a frame of operation of the plurality of detectors comprising consecutive subframes.

5. The ToF system of claim 4, therein the first plurality of phase offsets comprises four phase offsets.

6. The ToF system of claim 4, wherein the first plurality of phase offsets comprises four phase offsets corresponding to a first primary frequency of the two or more measurement frequencies and four phase offsets corresponding to a second primary frequency of the two or more measurement frequencies, and wherein the second subset of the detection signals comprises only a single phase offset corresponding to the at least one disambiguation frequency.

7. A Time of Flight (ToF) system comprising:
   one or more optical elements configured to emit optical signals at two or more measurement frequencies and at least one disambiguation frequency;
   a detector array comprising a plurality of detectors that are configured to output respective detection signals responsive to light provided thereto; and
   a circuit configured to control the detector array to obtain a first subset of the detection signals at a first plurality of phase offsets corresponding to the two or more measurement frequencies and to obtain a second subset of the detection signals at a second plurality of phase offsets corresponding to the at least one disambiguation frequency, wherein the second plurality comprises fewer phase offsets than the first plurality,
   wherein the two or more measurement frequencies comprise a first unambiguous range associated therewith, wherein the at least one disambiguation frequency comprises a second unambiguous range associated therewith, and wherein the first unambiguous range is less than the second unambiguous range.

8. A Time of Flight (ToF) system, comprising:
   one or more optical elements configured to emit first optical signals at two or more measurement frequencies and to emit second optical signals at one or more disambiguation frequencies;
   a detector array comprising a plurality of detectors that are configured to output respective detection signals responsive to light provided thereto; and
   a circuit configured to perform operations comprising:
   receiving first detection signals from the detector array, the first detection signals representing a first plurality of phase offsets associated with the first optical signals;
   receiving second detection signals from the detector array, the second detection signals representing a second plurality of phase offsets associated with the second optical signals, wherein the second plurality comprises fewer phase offsets than the first plurality;

computing an estimated distance to a target based on the first detection simals; and computing an actual distance to the target based on the estimated distance and the second detection signals,
wherein the one or more disambiguation frequencies are less than a difference between the two or more measurement frequencies.

9. The TOE system of claim 8, wherein the circuit is configured to determine a plurality of potential distances of the target based on the first detection signals, and to identify a subset of plurality of potential distances based on the second detection signals.

10. The ToF system of claim 8, wherein the first detection signals comprise a first plurality of subframes received from the detector array at the first plurality of phase offsets, and wherein the second detection signals comprise a single subfraine received from the detector array at a second phase offset.

11. The ToF system of claim 10, wherein the first plurality of phase offsets comprises four phase offsets.

12. The ToP system of claim 8, wherein the first detection signals comprise four phase offset measurements at a first primary frequency of the two or more measurement frequencies and four phase offset measurements at a second primary frequency of the two or more measurement frequencies, and
wherein the second detection signals comprise only a single phase offset measurement at the one or more disambiguation frequencies.

13. A Time of Flight (ToF) system, comprising:
one or more optical elements configured to emit first optical signals at two or more measurement frequencies and to emit second optical signals at one or more disambiguation frequencies,
a detector array comprising a plurality of detectors that are configured to output respective detection signals responsive to light provided thereto; and
a circuit configured to perform operations comprising:
receiving first detection signals from the detector array, the first detection signals representing a first plurality of phase offsets associated with the first optical signals;
receiving second detection signals from the detector array, the second detection signals representing a second plurality of phase offsets associated with the second optical signals. wherein the second plurality comprises fewer phase offsets than the first plurality;
computing an estimated distance to a target based on the first detection signals: and computing an actual distance to the target based on the estimated distance and the second detection signals,
wherein the two or more measurement frequencies comprise a first unambiguous range associated therewith, wherein the one or more disambiguation frequencies comprise a second unambiguous range associated therewith, and wherein the first unambiguous range is less than the second unambiguous range.

14. The ToF system of claim 8, wherein the one or more optical elements are further configured to be phase-locked to a clock signal to emit the first optical signals as bursts of pulsed light at the two or more measurement frequencies, and
wherein the plurality of detectors are further configured to output the first detection signals based on measurements taken at phase delays of the two or more measurement frequencies.

15. The ToF system of claim 8, wherein the one or more optical elements are further configured to he phase-locked to a clock signal to emit the first optical signals as bursts of pulsed light that are offset relative to the clock signal by phase delays of the two or more measurement frequencies, and
wherein the plurality of detectors are further configured to output the first detection signals based on measurements taken responsive to the bursts of pulsed light.

16. The ToF system of claim 15, wherein the one or more optical elements are further configured to offset the second optical signals relative to the clock signal from the first optical signals.

17. A method of calculating an actual distance to a target in a lidar system, comprising:
receiving first detection signals from a detector array of the lidar system responsive to first optical signals emitted by one or more optical elements at two or more measurement frequencies, the first detection signals representing a first plurality of phase offsets associated with the first optical signals;
receiving second detection signals from the detector array responsive to second optical signals emitted by the one or more optical elements at one or more disambiguation frequencies, the second detection signals representing a second plurality of phase offsets associated with the second optical signals, wherein the second plurality comprises fewer phase offsets than the first plurality;
computing an estimated distance to the target based on the first detection signals; and computing the actual distance to the target based on the estimated distance and the second detection signals
Wherein the one or more disambiguation frequencies are less than a difference between the two or more measurement frequencies.

18. The method of claim 17, wherein computing the actual distance to the tartlet comprises determining a plurality of potential distances of the target based on the first detection signals, and reducing a number of the plurality of potential distances based on the second detection signals.

19. The method of claim 17, wherein the first detection signals comprise a first plurality of subframes received from the detector array at the first plurality of phase offsets, and wherein the second detection signals comprise a single subframe received from the detector array at a second phase offset.

20. The method of claim 17, wherein the one or more disambiguation frequencies are different from each of the two or more measurement frequencies.

21. A method of calculating an actual distance to a target in a lidar system, comprising:
receiving first detection signals from a detector array of the lidar system responsive to first optical signals emitted by one or more optical elements at two or more measurement frequencies, the first detection signals representing a first plurality of phase offsets associated with the first optical signals;
receiving second detection signals from the detector array responsive to second optical simals emitted by the one or more optical elements at one or more disambiguation, frequencies, the second detection signals representing a second plurality of phase offsets associated with the second optical signals, wherein the second plurality comprises fewer phase offsets than the first plurality;
computing an estimated distance to the tamet based on the first detection signals; and computing the actual distance to the target based on the estimated distance and the second detection signals, wherein the two or more measurement frequencies comprise a first unambiguous range associated therewith. wherein the one or more disambinuation frequencies comprise a. second unambiguous range associated therewith, and wherein the first unambiguous range is less than the second unambiguous range.

* * * * *

UNITED STATES PATENT AND TRADEMARK OFFICE
CERTIFICATE OF CORRECTION

PATENT NO. : 11,287,517 B2
APPLICATION NO. : 17/268756
DATED : March 29, 2022
INVENTOR(S) : Dehlinger et al.

Page 1 of 1

It is certified that error appears in the above-identified patent and that said Letters Patent is hereby corrected as shown below:

In the Specification

Column 16, Line 40: Please correct. "0Θ," to read -- Θ, --

In the Claims

Column 22, Line 19, Claim 5: Please correct "therein" to read -- wherein --

Column 23, Line 2, Claim 8: Please correct "simals;" to read -- signals; --

Column 23, Line 8, Claim 9: Please correct "TOE" to read -- ToF --

Column 23, Line 17, Claim 10: Please correct "subfraine" to read -- subframe --

Column 24, Line 31, Claim 17: Please correct "Wherein" to read -- wherein --

Column 24, Line 35, Claim 18: Please correct "tartlet" to read -- target --

Column 24, Line 57, Claim 21: Please correct "simals" to read -- signals --

Column 24, Line 64, Claim 21: Please correct "tamet" to read -- target --

Column 25, Line 2, Claim 21: Please correct "therewith." to read -- therewith, --

Column 25, Line 3, Claim 21: Please correct "disambinuation" to read -- disambiguation --

Column 25, Line 4, Claim 21: Please correct "comprise a." to read -- comprise a --

Signed and Sealed this
Twenty-seventh Day of September, 2022

Katherine Kelly Vidal
*Director of the United States Patent and Trademark Office*